Feb. 4, 1936. H. C. GUILD 2,029,422
CONDENSER
Original Filed Feb. 4, 1932 2 Sheets-Sheet 1
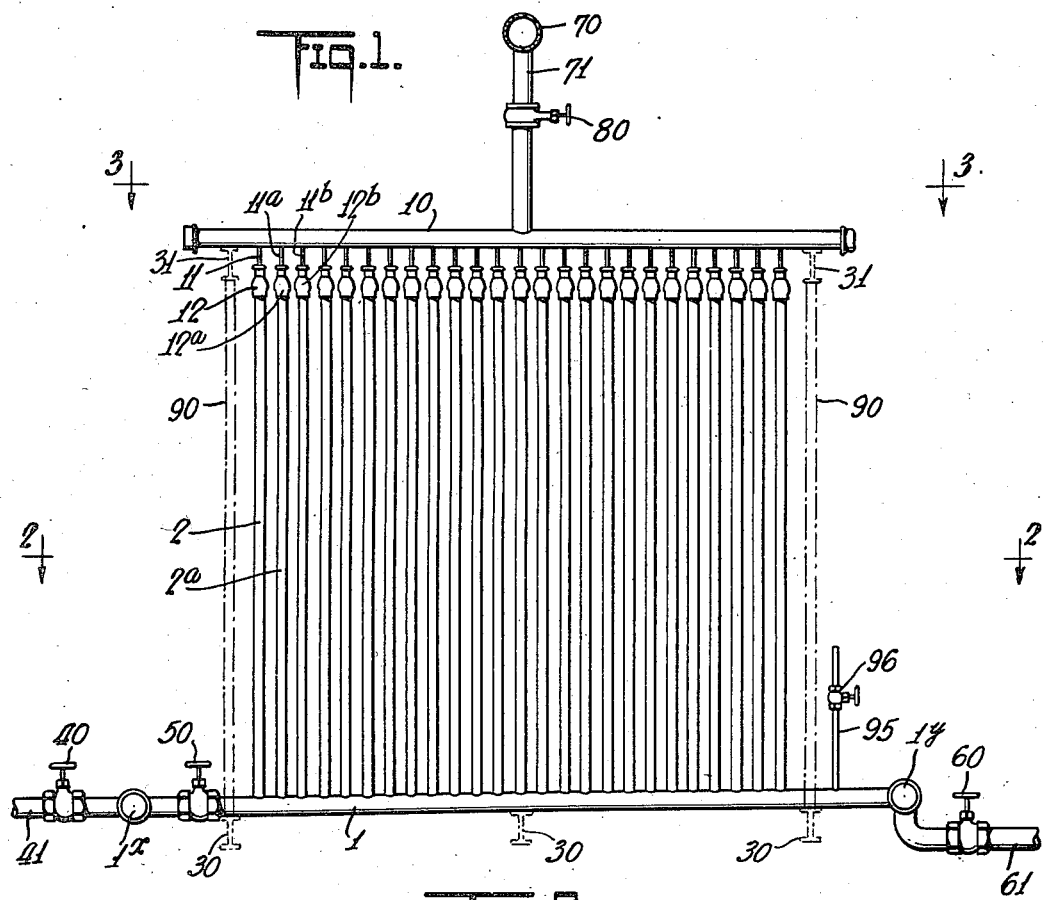
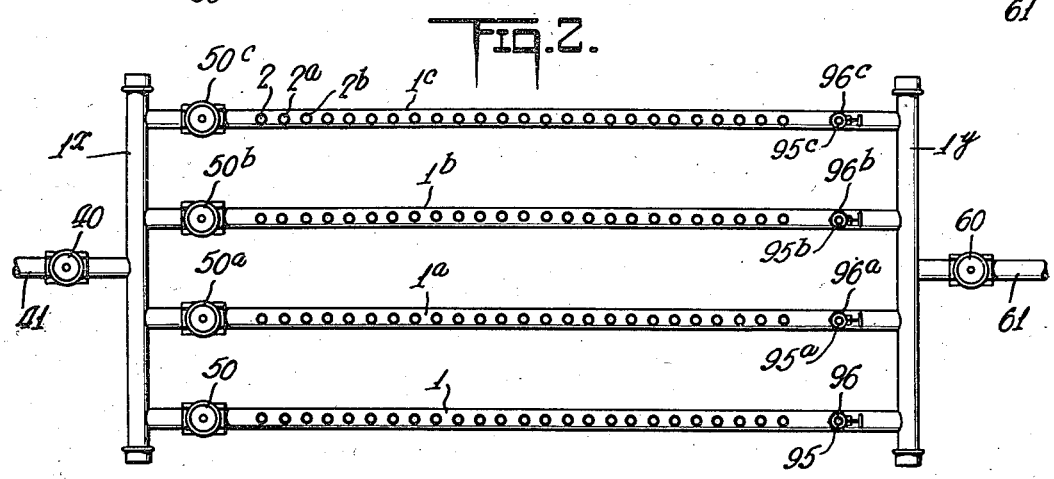
INVENTOR
Herbert C. Guild
BY
ATTORNEY Feb. 4, 1936. H. C. GUILD 2,029,422
CONDENSER
Original Filed Feb. 4, 1932  2 Sheets-Sheet 2
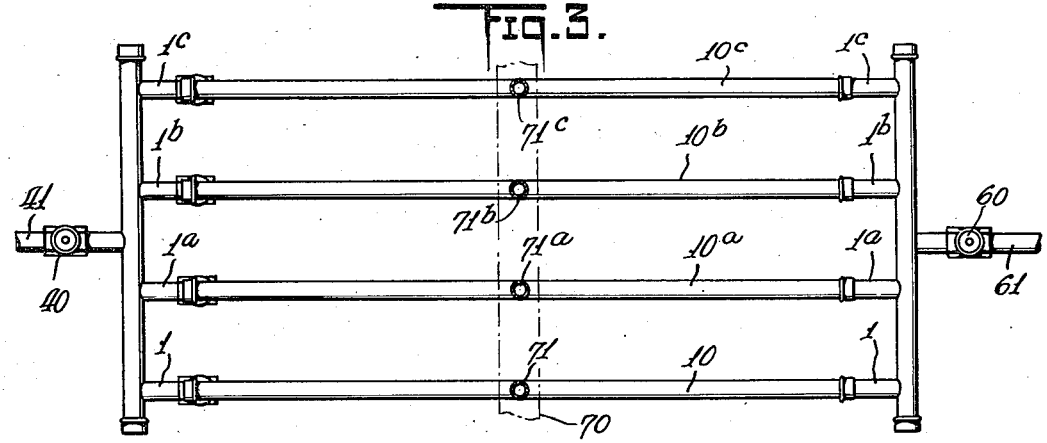
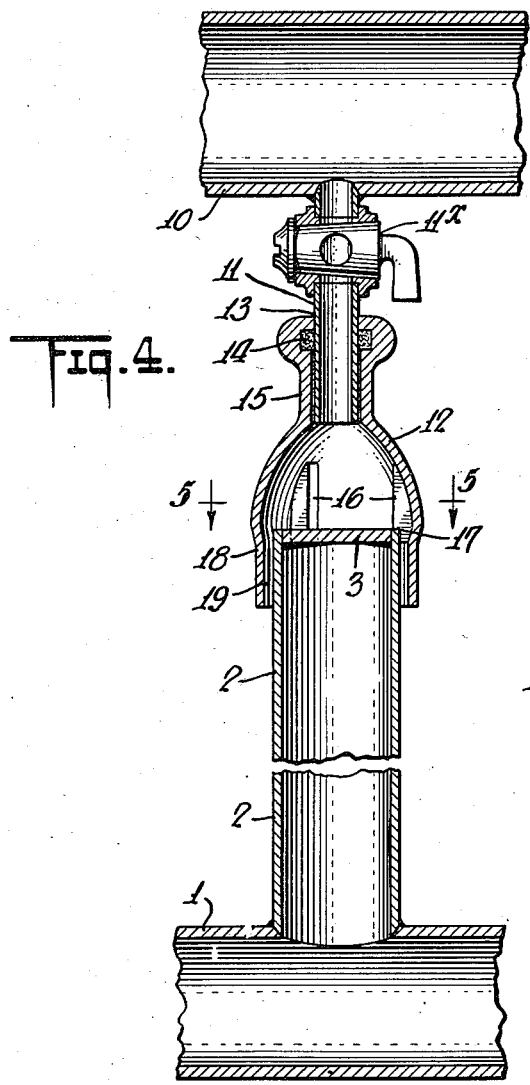
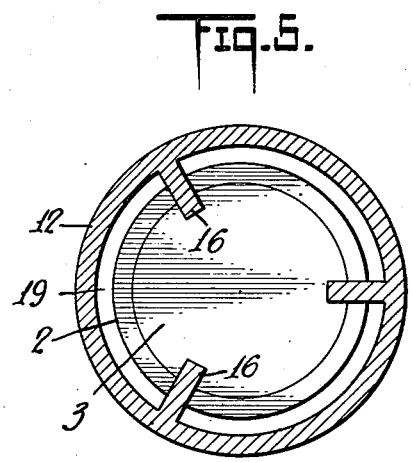
INVENTOR
Herbert C. Guild
BY
ATTORNEY Patented Feb. 4, 1936

2,029,422

UNITED STATES PATENT OFFICE 2,029,422

CONDENSER

Herbert C. Guild, Mamaroneck, N. Y.

Application February 4, 1932, Serial No. 590,857
Renewed June 22, 1935

8 Claims. (Cl. 257—35)

My present invention relates more particularly to condensers of the type in which comparatively hot condensible gas or vapor is condensed on one surface of a conduit, preferably, the inner surface of a tube or pipe, by a cooling fluid applied to the other surface of said conduit, tube or pipe. As concerns some features of my invention, the cooling fluid may be either a gas, such as air, or a liquid such as water, but other features are of importance only where a water film on the exterior of a condenser pipe, is employed in combination with an atmospheric air draft evaporating water from the outer surface of said film. While primarily designed for condensation of compressed gas from a refrigerating machine, such as ammonia or the like, and particularly for use in large plants, it will be evident that the invention and various features thereof will be applicable to other heat transfer apparatus, and may be of various capacities and sizes to suit the use.

One object of the invention is to provide a relatively simple, cheap construction whereby rapid flow of an even film of water, preferably of adjustable volume and thickness, may be maintained upon the outer surface of the condenser pipe. Preferably, also, the construction is such that a rapidly flowing uniform film of the condensate is maintained on the interior surface of said pipe.

These results cannot be obtained in an ordinary water and air cooled condenser in which the condensing pipes are laid horizontally. The water has to drip downward from pipe to pipe, so that its rate of downflow over the pipe surface, is very slow. Furthermore, any substantial velocity of air employed to evaporate the water will tend to blow the water either off the pipes or to one end thereof. This makes it next to impossible to maintain an even film of water.

Inside the pipe, the condensate travels in a horizontal, or nearly horizontal path, to the outflow end of the pipe, so that its flow is very sluggish. This permits heat insulating films of various impurities, such as lubricating oil, to settle upon the inner condensing surface, thus impairing the efficiency of the surface as a heat transfer medium. Moreover, the uncondensed gas has to travel the greatest possible distance in order to reach the last area of condensation surface. This distance is even greater when two or more pipes are connected in series.

As contrasted with the foregoing, my invention involves utilizing upright condensing pipes, preferably vertical or substantially so, whereby water from the upper end of the pipe can flow downward at maximum speed, and the film may be of uniform thickness circumferentially, and its thickness may be as great as practically desirable, notwithstanding the fact that such increase in thickness greatly decreases the effectiveness of surface tension in maintaining integrity of the film. With a film of very substantial thickness, flowing vertically, the adhesion of the water to the surface of the pipe, plus surface tension, will be sufficiently great to insure uniformity of thickness and to reduce to a minimum, splashing and loss of water through the windage.

An important feature, both as concerns uniformity and velocity of external water film and of internal condensate film, is having the condenser pipes all connected to a lower horizontal header and each closed at the upper end, so that they operate in parallel, gas flow being upward in every tube and all condensate flow being downward in the same tube.

The feature of closed or blind upper ends for each condenser tube is of advantage as concerns applying the water symmetrically to the exterior of the pipe at the upper end thereof. This facilitates a novel construction for the water supply whereby the parts are easily removed for cleaning or adjusted for the purpose of varying the volume of flow of the water.

It is important to note that this novel feature of having the condenser pipes each with a blind upper end so that the gas flows upward and the condensate downward in every pipe, is the result of my discovery that such a thing is possible. Any one skilled in such matters would naturally assume that non-condensible gases, which are practically unavoidable in a condensing system, would remain pocketed in the upper or blind ends of the pipes, but I have discovered that thermocirculation of the gas and downflow of the condensate in each pipe, is sufficient to prevent substantial accumulation of non-condensible gases in the upper end thereof. Purge valves in the lower header are usually sufficient, although individual purge valves may be applied at the upper ends of each pipe, for special purposes or to meet special conditions, such as initial starting where the vertical pipes are high and are full of air.

The above and other features of my invention will be more evident from the following description in connection with the accompanying drawings, in which Fig. 1 is a side elevation showing one embodiment of my invention;

Fig. 2 is a horizontal section on the line 2—2, Fig. 1;

Fig. 3 is a plan view in section on the line 3—3, Fig. 1;

Fig. 4 is a vertical axial section of a single condenser unit, showing internal construction thereof; and Fig. 5 is a horizontal section on the line 5—5, Fig. 4.

In these drawings, the apparatus is shown as including a low-level conduit 1 for supplying the hot gas or vapor to be condensed, an upflow conduit 2, connected to the supply conduit 1, and cooperating means for supplying cooling liquid, including a high level conduit 10, down conduit 11 and water control nozzle 12.

As shown in Figs. 1 and 2, these conduits may be ordinary pipes, and conduit pipes 1, 10 may be of relatively large size to serve as headers, pipe 1 supplying any desired number of parallel-connected upflow condenser pipes 2, 2a, etc.; and pipe 10 supplying the downflow water-distributing pipes 11, 11a, etc., leading to control nozzles 12, 12a; and as shown in Fig. 3, any desired number of such sets of headers 1, 1a, etc. and 10, 10a, etc., with their connecting condenser elements, may be connected in parallel by headers 70 for the water, and 1x, 1y, for the gas or vapor.

The upper header or headers, water-distributing pipes and control nozzles are preferably supported independently of the lower header and its condensing elements, as indicated by the I-beam supports 30 for the latter and 31 for the former.

The condensing pipes and water-distributing means therefor, are preferably similar. As shown in Fig. 4, a relatively large pipe 1 serving as a gas distributing header, has the upright condensing pipe 2 secured therein. Pipe 2 is preferably closed at the upper end as by a disc or plug 3. The joints are preferably secured by welding, particularly where ammonia or other dangerous vapor is employed under pressure. The above arrangement of a horizontal header with parallel pipes each closed at the upper end is extremely simple, cheap to build and affords a minimum number of joints at which breakage or leakage can occur.

Water from the upper header flows downward through a distributing pipe 11, preferably to the center of the upper or blind end of the condensing pipe 2. It may be delivered directly by bringing the pipe 11 nearly into contact therewith, but I prefer to have a protecting control coupling 12. This may be a casting closely fitting pipe 11 at the upper end 13, provided with a packing 14 and having a neck 15 of slightly larger diameter than pipe 11 so as to permit a slight amount of wobble for exact centering of the coupling nozzle 12 on the end of the pipe 2. The exact centering is afforded by lugs 16 secured to the coupling 12 and fitting the side and end of pipe 2 as shown at 17. Concentric with these shoulders is a downward annular extension 18, affording an annular space 19 for delivery of the annular film of water in contact with the exterior of pipe 2. Preferably this annulus is of the proper thickness for delivering a minimum film of water when the head of water is negligible and increased delivery of water through the same annulus may be provided by varying the rate of supply of the water so as to afford a greater or less static head. This may be accomplished in any suitable way, as by adjustment of the cock 11x or by sliding the coupling nozzle 12 upward on pipe 11.

Inflow of condensible gas may be controlled by suitable valves, as valve 40, in supply pipe 41 and valves 50, 50a, etc. in headers 1, 1a, etc. Outflow of condensate may be controlled by valve 60 in outlet pipe 61. Inlet of water from header 70, through pipe 71 into header 10 may be controlled by valve 80. Obviously, the condensing elements may be enclosed by any suitable casing as 90, adapted to confine and direct the draft of air which is used to cool and to evaporate the water from the films that flow down the exterior of the condensing pipes 2, 2a, etc.

In operation, the water is turned on at a normal rate of flow predetermined by valve 80 to maintain a predetermined level of water in the header 10. Then a normal predetermined volume of water for the films on condensing pipes 2 is predetermined by adjustment of valves 11x. Gate valves 40, 50, are then opened to admit the ammonia or other gas to be condensed. Outlet valve 60 will be opened to permit drainage of condensate from header 1. The outlet from pipe 61 will be normally liquid-sealed so that the depth of condensate in the bottom of header 1, may be very small even though said header is horizontal. It is important to have the depth of condensate in this header small enough so that there wil be a free, practically no-resistance path for flow of the hot vapor, to all of the condensing tubes so that each of them will be equally loaded. The header 1 may be scavenged either initially or at any time during operation by discharge of gas through pipes 95, 95a, etc. by opening valves 96, 96a, etc.

As before indicated, the hot vapor will flow up the tube 2 in heat exchange relation with the inner surface thereof. As fast as condensed, it will flow down at maximum speed, washing the walls, and the vapor thus removed will be replenished by continued upflow from header 1. The inner surfaces of 2 being relatively cold, the gas in contact with said inner surface, or with the relatively cool condensate flowing down the same, will be normally cooler than the hot gas. Consequently, there will be a marked tendency to thermo-circulation of the fresh hot gas upward at the center to pipe 2 and the cooler gas downward adjacent the inner surface of the pipe. In practice, this is found to be sufficient to prevent trapping of non-condensible gases in the upper part of the tube.

In my apparatus, the water is delivered on the top of the pipe at one end. The pipe is placed vertical. Water once started down the outer surfaces of the pipe, is in a condition to accelerate its speed over the condensing surface, thereby increasing its ability to transfer heat. The water is held to the pipe by adhesion and surface tension, so that the pipe has an even film of water from end to end.

The condensate forming on the inner surface of pipe 2, runs down the pipe in a vertical direction, thus assisting and assisted by the down-leg of thermo-circulation of the condensing gas. The speed of the condensate down the condensing surface is a maximum, so that for a given rate of condensation the thickness of the film and resulting insulating effect will be a minimum. The heat transferability is further increased because the high speed downflow of the condensate tends to wash the inner condensing surface free from insulating and heat retarding films, oils and other non-condensible substances.

In connection with the foregoing, it may be helpful to know that in practice, particularly in a large plant, the condensing pipes 2, may be, say, one inch to two inches or more in diameter and may be 20 to 50 feet high. With such pipes of large size and great height, the simplicity and ruggedness of the construction are of great advantage.

Moreover, the higher the tube, the greater the volume and resulting velocity of the downflowing condensate. This contributes to effective washing of the inner walls of the tube.

The relation of height of condensing pipe to volume and velocity of downflow applies as to the external film of water, except that all of the water is supplied at the top and as it flows down, the water film tends to thin out to a uniform velocity and thickness dependent on the rate of the initial supply, whereas the condensate film is a minimum at the top and is augmented all the way down. It will be evident, however, that the same tendencies are present, though less accentuated, even where the apparatus is designed on a very small scale so that the pipes 2 are relatively short and of small diameter.

So far as concerns the novel feature of parallel downflow of condensate in all of the tubes, it will be observed that this would be possible if the tubes were connected at the upper end by a gas header, and this may be permissible in some cases, but such cross-connection of the tubes affords an opportunity for a less effectively cooled tube to deliver uncondensed gas upward into the header, whence it will find its way downward in one of the more effective, better cooled tubes, thus tending to reverse the flow in that tube. Cross-connection also involves multiplying joints; also structural strains due to unequal expansion and contraction of pipes. In my condensing pipes with blind upper ends, the pipes can expand or contract unequally or to any extent without imposing any strain on any joint, because each has only one anchorage to one header.

I claim:

1. A condenser comprising a multiplicity of substantially vertical pipes, each closed at its upper end and having its lower end rigidly secured in a laterally extending header, means for supplying condensible gas for upflow in all of said pipes and for draining condensate from the lower end thereof, guide means engaging the upper ends of all of said pipes to permit free longitudinal expansion and contraction thereof, and means for maintaining a freely downflowing film of water on the exterior vertical surface of each pipe, each pipe having such cross-section as to permit upflow of gas in regions more remote from the inner walls of the tubes and downflow of condensate and gas adjacent said walls.

2. A condenser comprising a multiplicity of substantially vertical pipes each closed at its upper end and means for supplying condensible gas for upflow therein, and for draining condensate from the lower end thereof, and a distributing nozzle having an annular outlet for delivering a uniform film or layer of the water upon the exterior of each pipe, each pipe having such cross section as to permit upflow of gas in regions more remote from the inner walls of the tubes and downflow of condensate and gas adjacent said walls, at the upper end thereof.

3. A condenser comprising a header and a plurality of substantially vertical pipes having closed upper ends connected thereto in parallel and each affording a path for free upflow of condensible gas from and downflow of condensate into said header, and means including an independently supported water supply pipe and connections slidably engaging the upper end of each of said pipes for maintaining a freely downflowing film of water on the exterior vertical surfaces of each of said pipes, each pipe having such cross section as to permit upflow of gas in regions more remote from the inner walls of the tubes and downflow of condensate and gas adjacent said walls.

4. A condenser comprising a header and a plurality of substantially vertical pipes having closed upper ends connected thereto in parallel and each affording a path for free upflow of condensible gas from and downflow of condensate into said header, and means including an independently supported water supply pipe and connections slidably engaging the upper end of each of said pipes for delivering cooling water downward upon the closed upper end of each of said pipes, each pipe having such cross section as to permit upflow of gas in regions more remote from the inner walls of the tubes and downflow of condensate and gas adjacent said walls.

5. A condenser comprising a header and a plurality of substantially vertical pipes having closed upper ends connected thereto in parallel and each affording a path for free upflow of condensible gas from and downflow of condensate into said header, and an axially arranged cap formed with a distributing nozzle having an annular outlet for delivering a uniform film or layer of the water upon the exterior of each pipe at the upper end thereof.

6. A condenser comprising a header and a plurality of substantially vertical pipes having closed upper ends connected thereto in parallel and each affording a path for free upflow of condensible gas from and downflow of condensate into said header, and means for delivering cooling water downward upon the closed upper end of each of said pipes, and a distributing nozzle having an annular outlet for delivering a uniform film or layer of the water upon the exterior of said pipe upon and around the upper end thereof.

7. A condenser comprising a header, a plurality of substantially vertical pipes rigidly connected in parallel to said header, each closed at its upper end and each affording a path for free upflow of condensable gas from and downflow of condensate into said header, and a horizontal pipe with a connection around each vertical pipe permitting free longitudinal expansion and contraction of said vertical pipes and operating to maintain a freely down-flowing film of water on the exterior vertical surfaces of each of said pipes.

8. Apparatus for transferring heat between a downflowing layer of liquid and a fluid of different temperature, including a multiplicity of long substantially vertical pipes, each closed at its upper end and having an open lower end rigidly secured in a fixed laterally extending header for supplying it with said fluid, and said pipes having their upper ends free for longitudinal expansion and contraction movement independently of one another, in combination with independently supported pipes for supplying said liquid, each pipe terminating in a nozzle having lateral guides slidably engaging the upper end of one of said vertical pipes and an annular outlet for delivering a uniform film or layer of said liquid upon the exterior of said pipe, upon and around the upper end thereof.

HERBERT C. GUILD.